Nov. 8, 1932.      R. B. MUNDAY      1,887,276
FLUID MEASURE
Filed Oct. 26, 1931
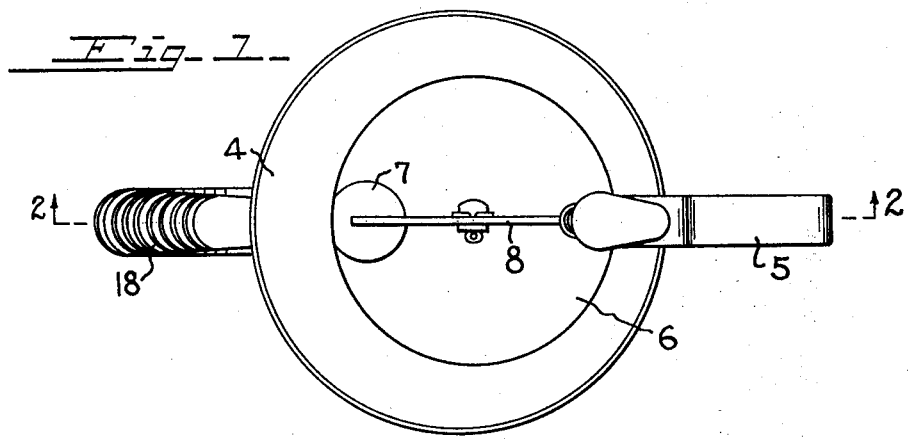
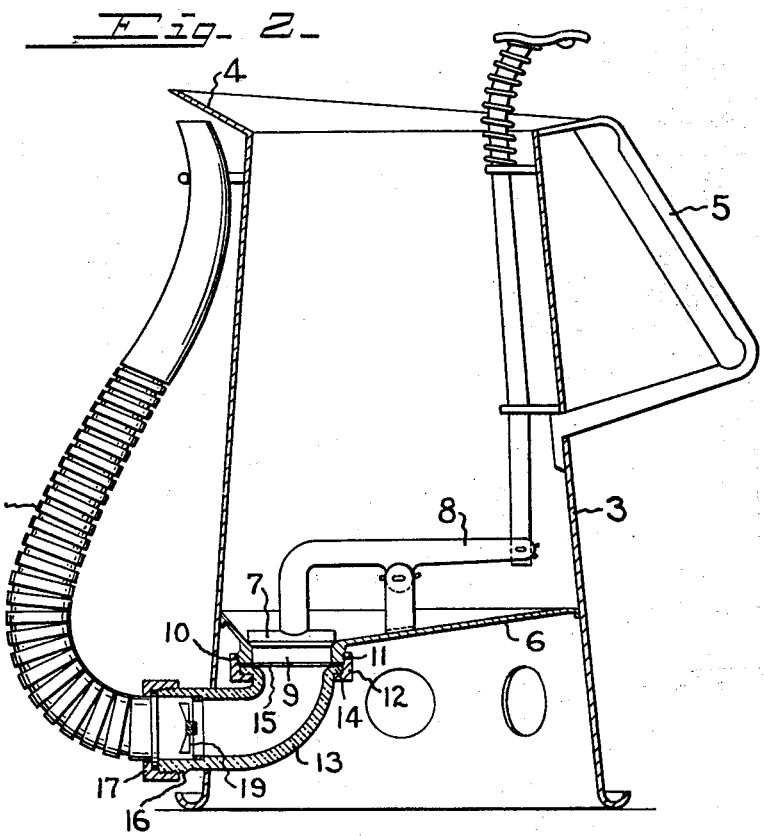
INVENTOR.
RICHARD B. MUNDAY.
BY
ATTORNEY.

Patented Nov. 8, 1932

1,887,276

UNITED STATES PATENT OFFICE

RICHARD B. MUNDAY, OF DAYTON, OHIO, ASSIGNOR, BY MESNE ASSIGNMENTS, TO THE CINCINNATI BALL CRANK CO., OF CINCINNATI, OHIO, A CORPORATION OF OHIO

FLUID MEASURE

Application filed October 26, 1931. Serial No. 571,172.

My invention relates to a liquid measure and particularly the type of measure shown and described in the reissue patent to Brookins, No. 17,202, of February 5, 1929.

Measures of this type are usually used in the dispensing of motor oils and similar materials. None of these measures previously constructed have provided any means for indicating quickly and with facility whether or not the measure is draining and what physical appearance the liquid has.

The principal object of my invention is to provide a liquid measure which is so constructed that the purchaser of the liquid being dispensed may readily see whether or not the measure is being drained and whether he is procuring the quality of liquid intended. With my measure, it is not necessary to look down into the open top of the measure to ascertain whether or not the liquid is drained and if the quality of oil being delivered is satisfactory.

In the particular embodiment of my invention selected for illustration;

Fig. 1 is a top plan view of the measure, and

Fig. 2 is a vertical section of the measure, certain of the parts being shown in full.

Referring now to the drawing, the measure is comprised of the usual conical side wall 3 and pouring lip 4. The handle 5 is secured to the side wall in any suitable manner to facilitate handling of the measure. I preferably use the type of bottom 6 shown in Reissue Patent 17,202, with the conventional valve 7 and valve operating mechanism indicated generally as 8.

The outlet 9 in the bottom 6 is externally threaded at 10 so as to co-act with the threads 11 on the screw ferrule 12. The elbow 13, which may be either transparent or translucent, has its outer end extending through the side wall of the measure and terminating shortly therebeyond, while at its other end it is outwardly flared at 14 so that it can be secured to the outlet 9. In assembling the elbow, it is placed against the bottom of the measure, and the screw ferrule 12 is put into place bearing against the outwardly flared portion 14 of the elbow to hold it tightly against the outlet when the threads 10 co-act with the threads 11. A gasket 15 may be placed between the elbow at 14 and the outlet 9 to insure against leakage at this point.

At its outer end, the elbow 13 is screw threaded at 16 so as to co-act with the threads on the screw ferrule 17 to hold the flexible hose 18 in fluid contact with the elbow 13.

As is clearly shown on Fig. 2 of the drawing, a sufficient portion of the transparent elbow 13 extends beyond the side wall of the measure to clearly show whether the liquid is being dispensed and what the quality of the fluid appears to be. To more definitely show the flow of liquid, an indicating spinner 19 of any conventional form, is secured within the elbow 13 in any suitable manner and at a point outside the side wall 3.

While the invention has been described above in its preferred form, it will be obvious that various changes and modifications can be made therein without departing from the spirit or scope thereof, and it is therefore desired that only such limitations be imposed thereon as are necessitated by the prior art or specifically set forth in the claim.

I claim:

A liquid measure having in combination a side wall, a bottom horizontally secured within said side wall, an outlet in said bottom, a transparent elbow removably secured to said bottom and extending through the side wall of said measure and a flexible hose removably secured to the outer end of said elbow.

In testimony whereof I have hereunto set my hand.

RICHARD B. MUNDAY.